(12) United States Patent
Chen et al.

(10) Patent No.: US 11,981,508 B2
(45) Date of Patent: May 14, 2024

(54) CONTAINER METHOD AND SYSTEM FOR AUTOMATED END-TO-END PACKAGE DELIVERY

(71) Applicant: Ford Global Technologies, LLC, Dearborn, MI (US)

(72) Inventors: Yifan Chen, Ann Arbor, MI (US); Smruti Panigrahi, Farmington Hills, MI (US); Kurt Lundeen, Wixom, MI (US); Geoffrey Horowitz, Farmington Hills, MI (US); Pavithra Madhavan, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 614 days.

(21) Appl. No.: 17/207,369

(22) Filed: Mar. 19, 2021

(65) Prior Publication Data
US 2022/0297939 A1 Sep. 22, 2022

(51) Int. Cl.
| | |
|---|---|
| *B65G 1/137* | (2006.01) |
| *B60P 3/00* | (2006.01) |
| *B65G 67/04* | (2006.01) |
| *B65G 67/24* | (2006.01) |

(52) U.S. Cl.
CPC ............ *B65G 1/1371* (2013.01); *B60P 3/007* (2013.01); *B65G 67/04* (2013.01); *B65G 67/24* (2013.01)

(58) Field of Classification Search
CPC .. B60P 3/007; G06Q 50/28; G05D 2201/0213
See application file for complete search history.

(56) References Cited

U.S. PATENT DOCUMENTS

| | | | |
|---|---|---|---|
| 9,928,749 B2 | 3/2018 | Gil et al. | |
| 10,131,451 B2 | 11/2018 | Salgueiro et al. | |
| 10,988,069 B2 * | 4/2021 | Vincent | B65G 13/02 |

(Continued)

FOREIGN PATENT DOCUMENTS

WO    2018024852 A1    2/2018

OTHER PUBLICATIONS

M. Figliozzi et al. "Autonomous Delivery Robots and Their Potential Impacts on Urban Freight Energy Consumption and Emissions".

*Primary Examiner* — Timothy R Waggoner
(74) *Attorney, Agent, or Firm* — Brandon Hicks; Eversheds Sutherland (US) LLP (57) ABSTRACT

Disclosed is an end-to-end delivery system that uses standard containers designed for autonomous vehicle (AV) goods delivery, a purpose-built AV cargo management system, a purpose-built robot to load and unload packages, and software to coordinate the various tasks involved. The standard containers may include a hardware locking interface for locking to a carrying robot. The cargo management system may include a programmable conveyor system installed on each floor of a multi-floor cargo space within the AV. For example, the floor may include a roller surface to allow omnidirectional routing of packages. An elevator shaft may be used for receiving and off-loading containers. The software may identify a target container anywhere within the multi-floor cargo space, and determine how to rearrange the containers within a grid in the AV so that the target container may be moved to the elevator shaft for unloading.

20 Claims, 7 Drawing Sheets

(56) References Cited

U.S. PATENT DOCUMENTS

| | | | |
|---|---|---|---|
| 11,724,633 B2* | 8/2023 | Perez | B65G 1/0478 |
| | | | 414/390 |
| 2017/0357919 A1* | 12/2017 | Bischoff | B07C 3/08 |
| 2018/0024554 A1* | 1/2018 | Brady | G06Q 10/0833 |
| | | | 701/23 |
| 2018/0326886 A1* | 11/2018 | Sibley | G06Q 10/08355 |
| 2018/0330313 A1* | 11/2018 | Clarke | B64F 1/32 |
| 2019/0220032 A1* | 7/2019 | Skorinko | G05D 1/0088 |
| 2019/0329987 A1* | 10/2019 | Meschenmoser | B24B 41/005 |
| 2020/0342392 A1* | 10/2020 | Godwin | B65G 1/0407 |
| 2021/0387808 A1* | 12/2021 | Kalouche | G06Q 10/083 |
| 2022/0119210 A1* | 4/2022 | Felton | B65G 1/0435 |

\* cited by examiner

CONTAINER METHOD AND SYSTEM FOR AUTOMATED END-TO-END PACKAGE DELIVERY

BACKGROUND

Worldwide e-commerce spending is increasing, resulting in an increase in package delivery operations. In order to improve hourly throughputs to meet the increase in demand, it is important to examine every aspect of delivery operation and cut any time wasted in the delivery process. It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Disclosed is an end-to-end delivery system that uses standard containers designed for autonomous vehicle (AV) goods delivery, a purpose-built AV cargo management system, a purpose-built robot to load and unload packages, and software to coordinate the various tasks involved. The standard containers may include identifications, e.g., a QR code, a door locking mechanism designed for a package carrying robot to operate, a hinged door to allow the package to slide out, a hardware locking interface for locking to a carrying robot, and a GPS tracker. The cargo management system may include a programmable conveyor system installed inside the AV. For example, the system may include a multi-floor cargo space. The floor may include a roller surface to allow omnidirectional routing of packages. An elevator shaft may be used for receiving and off-loading containers. The software may determine how to rearrange the containers within a grid in the AV so that packages may be moved to various locations.

The robot may be an autonomous robot located on board the AV. It may include wheels to allow the robot to move and a footprint of its loading platform that matches the container to allow the container to be placed on top of the robot so that the robot may move with the package. The robot also may be designed with an anchor mechanism for the container to latch on and secure in place during its transportation, plus the capabilities to unlock the container door, and deploy a ramp, as well as vibrate and reverse to add in the package's disposal leverage gravity. When the AV arrives at a delivery location, a container including a package to be delivered may be moved to the elevator in the AV, lowered to the autonomous robot, and secured to the robot. The robot may then be lowered to ground level and deliver the package in the container. Then the robot may carry the empty container and return to the vehicle to be picked up by the vehicle. The vehicle may then drive to the next delivery destination.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Figure 1:
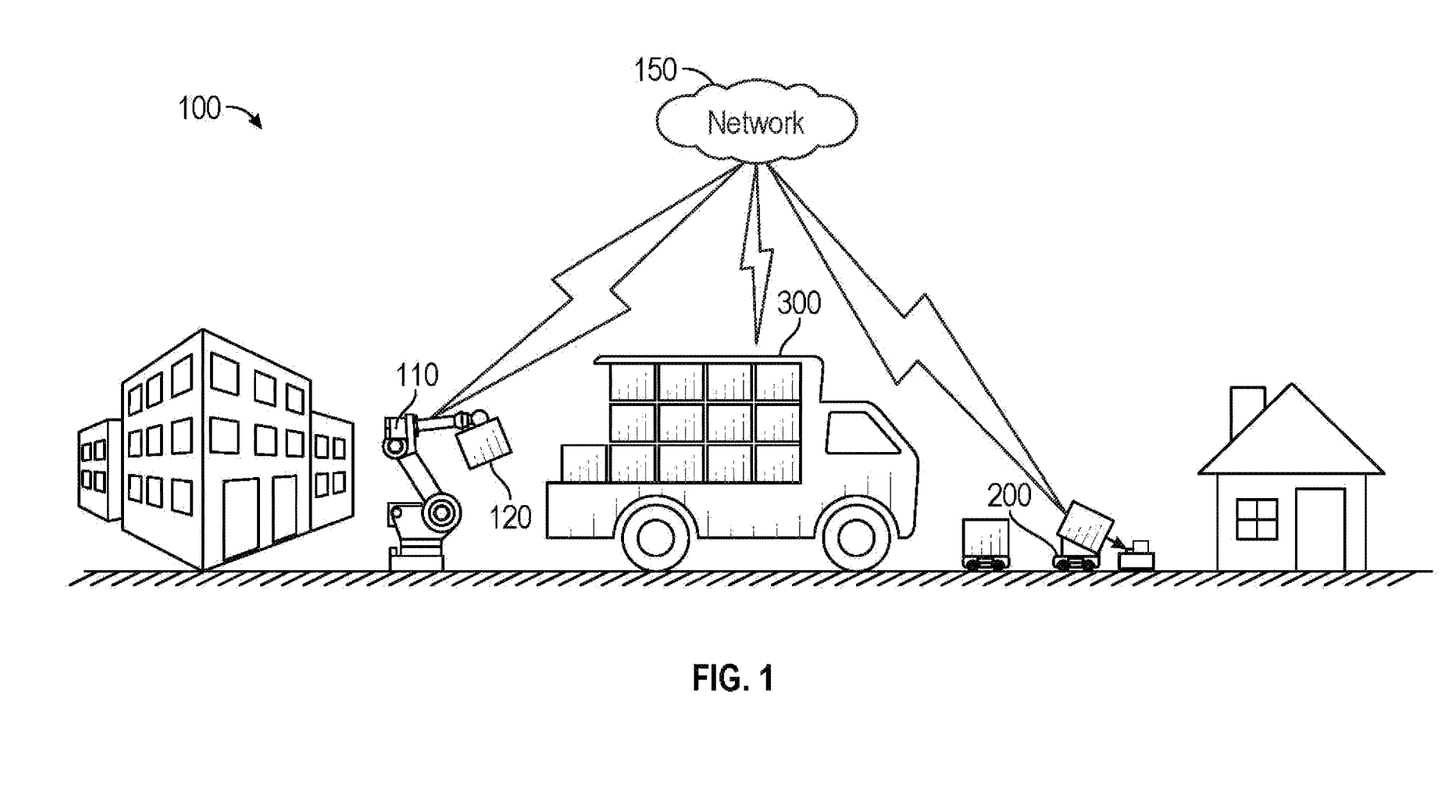
FIG. 1 illustrates a system for shipping goods packed in standard containers of uniform shape and size in accordance with the principles of the present disclosure.

Referring now to FIG. 1, system 100 for shipping goods packed in standard containers of uniform shape and size is provided. System 100 may include cargo loader 110, mobile robot 200, and delivery vehicle 300, all communicatively coupled to each other via, e.g., network 150. Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, man-to-machine communication, and/or visible light communications.

Some or all portions of the wireless communication link that supports communications between cargo loader 110, mobile robot 200, vehicle 300 and a communication device, such as a router, for example, that may be included in network 150, may be implemented using various types of wireless technologies, such as Bluetooth®, ZigBee®, or near-field-communications (NFC), cellular, Wi-Fi, Wi-Fi direct, machine-to-machine communication, man-to-machine communication, and/or a vehicle-to-everything (V2X) communication.

Cargo loader 110 may be a robot programmed to load standard containers 120 onto vehicle 300, e.g., via an elevator of vehicle 300 as described in further detail below. In some embodiments, cargo loader 110 may be a mobile robot, such as mobile robot 200, which may self-load standard container 120 onto vehicle 300 as described in further detail below. Alternatively, cargo loader 110 may be a robot arm programmed to load standard container 120 onto mobile robot 200, which may then self-load standard container 120 onto vehicle 300.

Figure 2A:
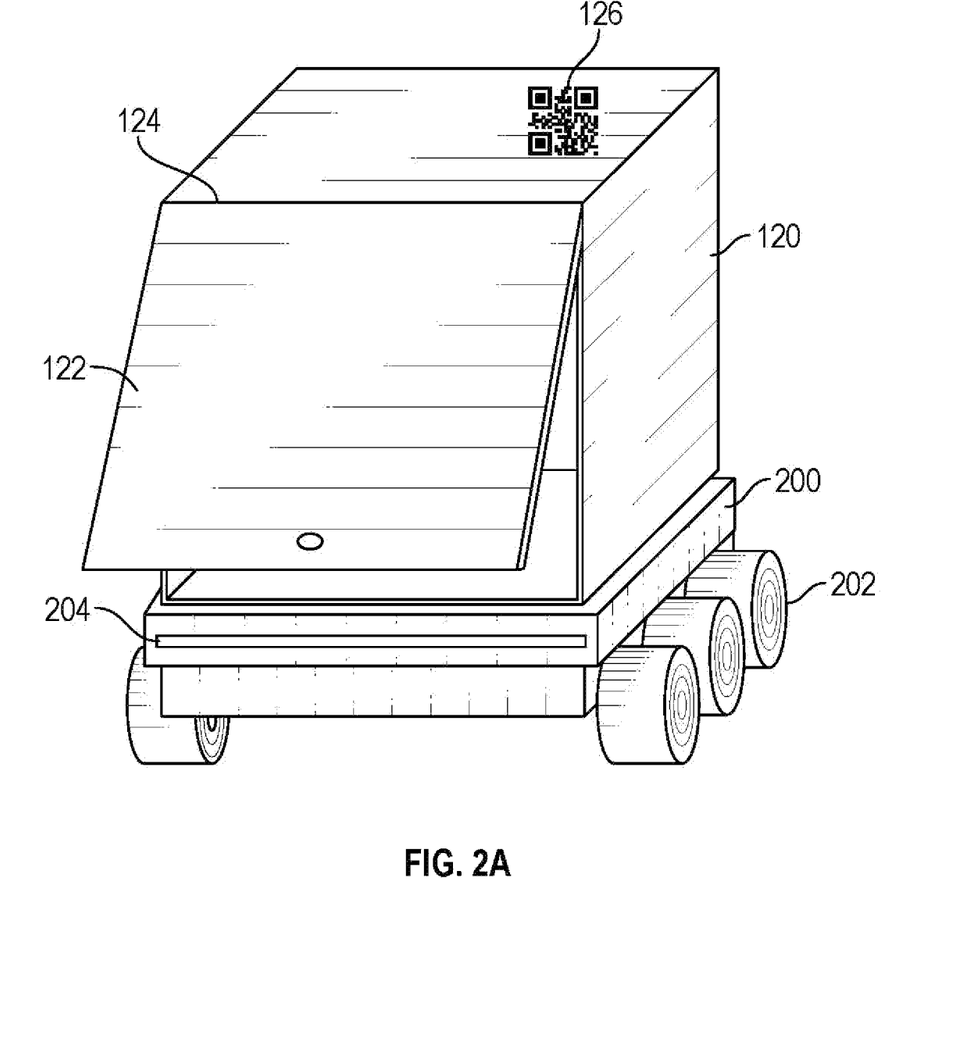
FIGS. 2A to 2C illustrate an exemplary purpose-designed mobile robot constructed to carry a standard container in accordance with the principles of the present disclosure.
Figure 2B:
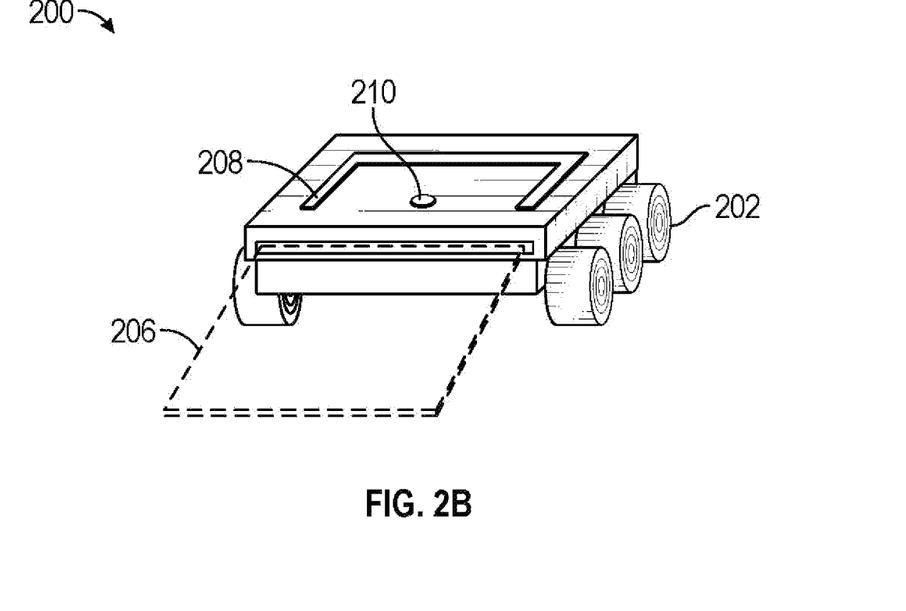
Figure 2C:
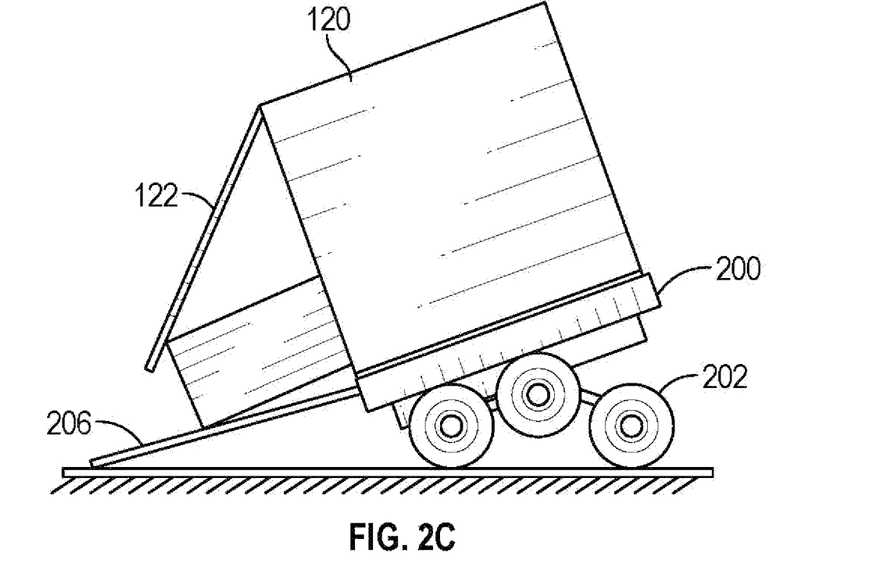

Referring now to FIGS. 2A to 2C, mobile robot 200 is described. Mobile robot 200 may be a wheeled robot that may include a plurality of sensors and/or cameras for self-driving of mobile robot 200. Moreover, mobile robot 200 may include a processor operatively coupled to a communication system for communicating with vehicle 300, e.g., for receiving a delivery route such that mobile robot 200 may transport standard container 120 from vehicle 300 to a target destination. As shown in FIG. 2A, mobile robot 200 may have a modular platform configured to be releasably couple to standard container 120. Specifically, standard container 120 may include a platform locking interface, e.g., on its bottom surface, and modular robot 200 may include container locking interface 208, as shown in FIG. 2B, for releasably engaging with the platform locking interface, e.g., when standard container 120 is positioned on top of modular robot 200.

As shown in FIG. 2A, standard container 120 may be a storage container having a standard size, sized and shaped to receive a package to be delivered. For example, standard container 120 may have the shape of a cube. The standard size of standard container 120 permits the standard containers of system 100 to be uniformly and conveniently loaded onto vehicle 300, moved around within the multi-floor cargo space of vehicle 300 as described in further detail below, and transported via modular robot 200. Moreover, standard container 120 may include a unique identification code, e.g., QR code 126, for identification of standard container 120 and the contents therein, e.g., via a database over network 150. For example, the identification code of standard container 120 may be scanned upon loading onto vehicle 300, such that the exact location of standard container 120 within vehicle 300 is known and stored, e.g., within a database via network 150.

Standard container 120 may include door 122 coupled to standard container 120 via hinge 124. Accordingly, door 122 may be actuated to open and close to receive and deliver a package within the interior compartment of standard container 120. In some embodiments, hinge 124 is a passive hinge, such that when modular robot 200 is angled relative to the ground, as shown in FIG. 2C, the package within the standard container 120 may slide out due to gravity. Accordingly, door 122 may include a lock which may be actuated to lock and unlock door 122 in the closed configuration, via door locking interface 210, as shown in FIG. 2B.

Alternatively, standard container 120 may include a slidable door that may slide between an open configuration and a close configuration, e.g., via a door track extending along the upper or lower edge of standard container 120 and the side of standard container 120 containing the door. Thus in the open configuration, the door may extend parallel to an upper or lower surface of standard container 120, and in the closed configuration, the door may extend perpendicular to the upper or lower surface of standard container 120, thereby protecting the contents within standard container 120.

As shown in FIG. 2A, modular robot 200 may include ramp inlet 204, such that ramp 206 may be extended and retracted therethrough, as shown in FIGS. 2B and 2C. Accordingly, ramp 206 may be positioned in an interior of modular robot 200 when not in use, and further may be extended to provide a surface joining the interior of standard container 120 with the ground. As shown in FIGS. 2A to 2C, modular robot 200 may include a plurality of omni-directional wheels 208. Wheels 208 may be actuated to self-drive modular robot 200, and further may be actuated to adjust the angle of standard container 120 disposed thereon relative to the ground, as shown in FIG. 2C. Accordingly, ramp 206 may be extended when standard container 120 is angled, and door 122 may be unlocked to permit a package stored within standard container 120 to slide out due to gravity.

Figure 3A:
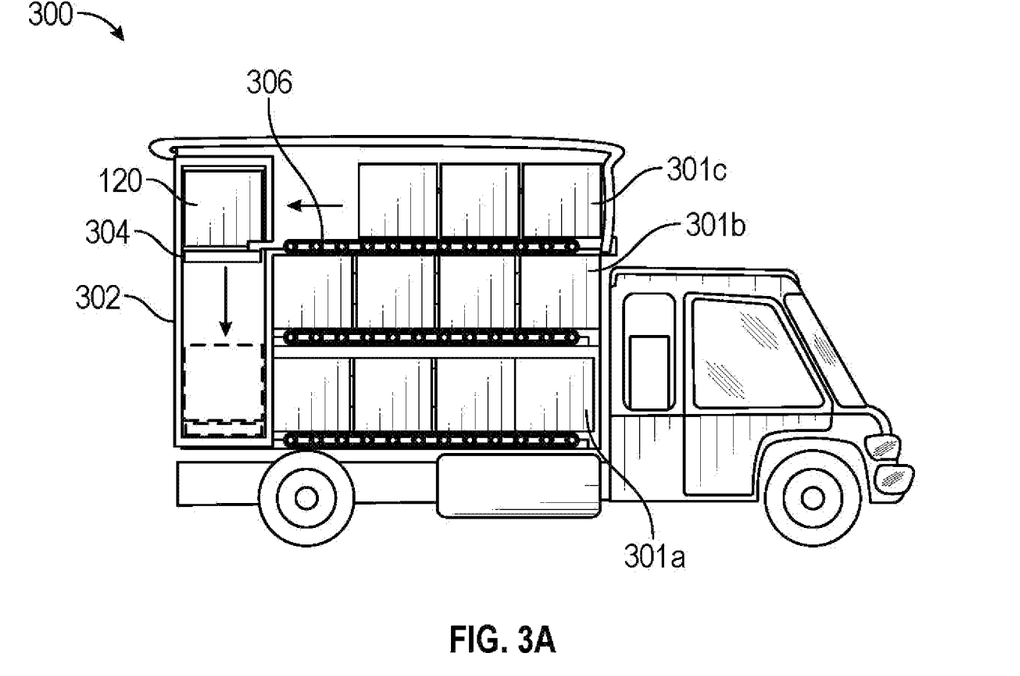
FIGS. 3A and 3B illustrate an exemplary delivery vehicle with multi-layer, modular conveyer systems for moving the standard containers constructed in accordance with the principles of the present disclosure.
Figure 3B:
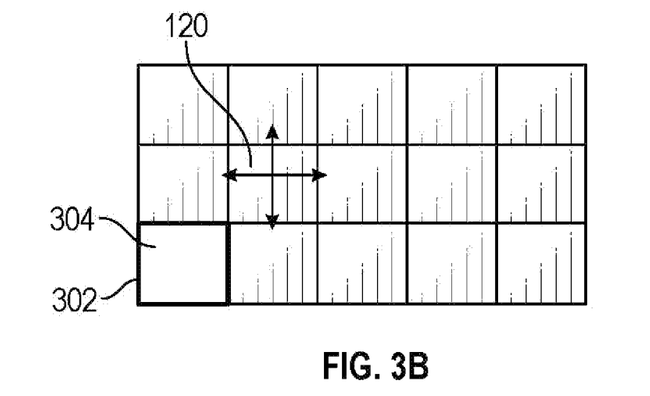

Referring now to FIGS. 3A and 3B, delivery vehicle 300 is provided. Vehicle 300 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

As shown in FIG. 3A, the interior space of vehicle 300 may include a multi-floor cargo space. For example, the multi-floor cargo space may include vertically stacked first floor 301*a*, second floor 301*b*, and third floor 301*c*. As will be understood by a person having ordinary skill in the art, the multi-floor cargo space of vehicle 300 may include less or more than three floors. Moreover, the floor of each of first floor 301a, second floor 301b, and third floor 301c may include rollers and/or conveyor belt system 306 for moving standard container 120 thereon. For example, the floor of multi-floor cargo space may be constructed similar to that described in U.S. Patent Application Publication No. 2020/0354171, the entire contents of which is incorporated herein by reference.

FIG. 3B is a top view of a single floor of multi-floor cargo space. As shown in FIG. 3B, each floor may include a plurality of cells forming a grid. The floor of each cell may include individually programmable and actuatable rollers and/or conveyor belt system 306 for moving standard container 120 thereon between cells. For example, as shown in FIG. 3B, standard container 120 may move omni-directionally in the direction of each arrow, e.g., up, down, left, or right. In one embodiment, rollers 306 may permit omni-directional movement of standard container 120 thereon. Alternatively, conveyor belt system 306 may permit movement in a single direction, e.g., up, and may further be rotated about a vertical axis of the cell to change the direction of movement to, e.g., right, down, or left. Accordingly, conveyor belt system 306 may be rotated to permit longitudinal movement in 90 degree increments, e.g., 90 degrees, 180 degrees, and 270 degrees from an initial direction, such that standard container 120 disposed thereon may move between adjacent cells. As shown in FIG. 3B, every cell of a floor of the multi-floor cargo space may contain a standard container thereon, except at least one, such that a target container on any cell within the floor of the multi-floor cargo space may be moved along a pathway toward elevator 302, as described in further detail below.

Vehicle 300 may include elevator 302 extending across each floor of the multi-floor cargo space. For example, elevator 302 may be a worm gear lift table. Elevator 302 may be positioned, e.g., at the rear of vehicle 300 for easy access to modular robot 200, as described in further detail below. As will be understood by a person having ordinary skill in the art, elevator 302 may be positioned anywhere along the perimeter of vehicle 300 to facilitate loading and unloading of standard container 120. Elevator 302 may include programmable moveable elevator floor 304, configured to move vertically between each floor of the multi-floor cargo space, and to permit omni-directional movement of standard container 120 thereon. Accordingly, elevator floor 304 may receive standard container 120 from any floor of the multi-floor cargo space and transport standard container 120 to a delivery window of vehicle 300. Vehicle 300 may include a control module having a processor for identifying target standard containers, and providing a pathway to transport a target standard container from any cell within the multi-floor cargo space to elevator floor 304, as described in further detail below.

Figure 4:
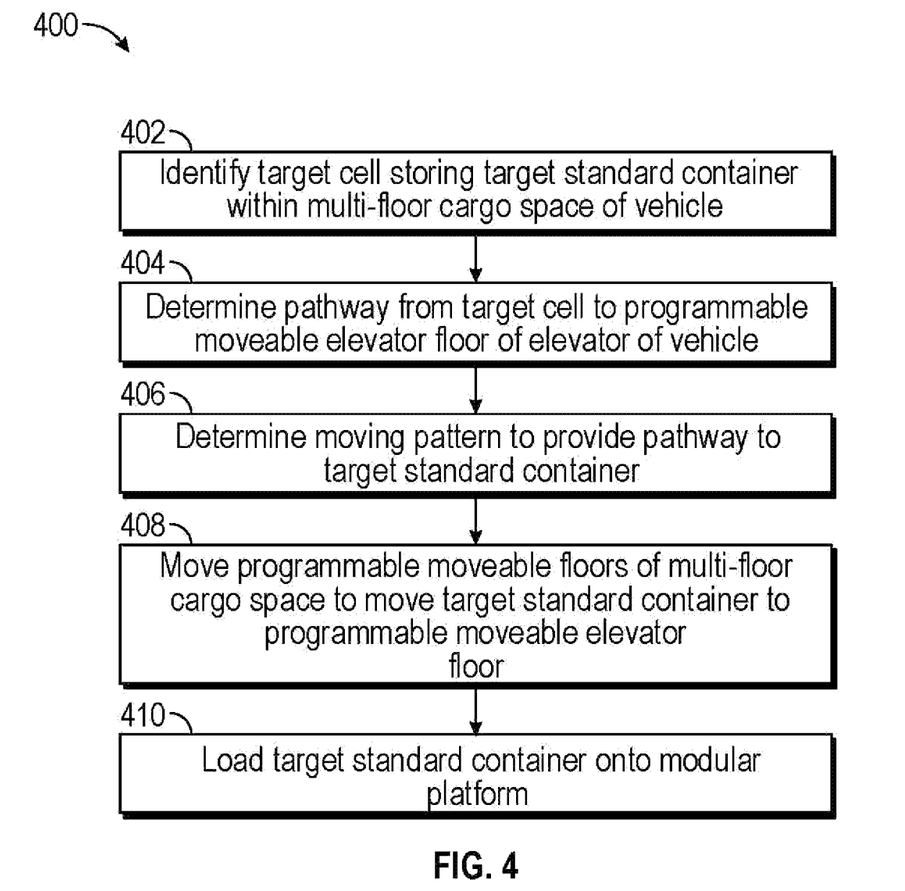
FIG. 4 is a flow chart illustrating exemplary steps for moving standard containers in accordance with the principles of the present disclosure.

Referring now to FIG. 4, exemplary method 400 for cargo movement for moving standard containers 120 using the modular conveyor systems described herein is provided. Some of the steps of method 400 may be further elaborated by referring to FIGS. 5A to 5C. As vehicle 300 arrives at the target delivery destination, at step 402, the target cell of the multi-floor cargo space containing the target standard container to be delivered may be identified. For example, the target standard container may be identified via its unique identification code. Accordingly, the control module of vehicle 300 may store the location, e.g., which cell and on which floor of the multi-floor cargo space within vehicle 300 the target standard container is located, within a database via network 150. Elevator floor 304 of elevator 302 may move vertically to align itself with the floor of the multi-floor cargo space where the target standard container is located.

At step 404, the control module of vehicle 300 may determine a pathway from the target cell to elevator floor 304, such that the target standard container may be moved from the target cell to elevator floor 304 via rollers and/or conveyor belt 306. One or more standard containers may be disposed on cells along the determined pathway. Accordingly, the standard containers on or adjacent to the determined pathway may have to be moved, e.g., into an empty cell, to clear the pathway for the target standard container to be moved to elevator floor 304. Thus, at step 406, the control module of vehicle 300 may determine a moving pattern configured to clear the pathway for the target standard container to be moved to elevator floor 304. At least one cell must initially be free of a standard container, e.g., elevator floor 304.

Figure 5A:
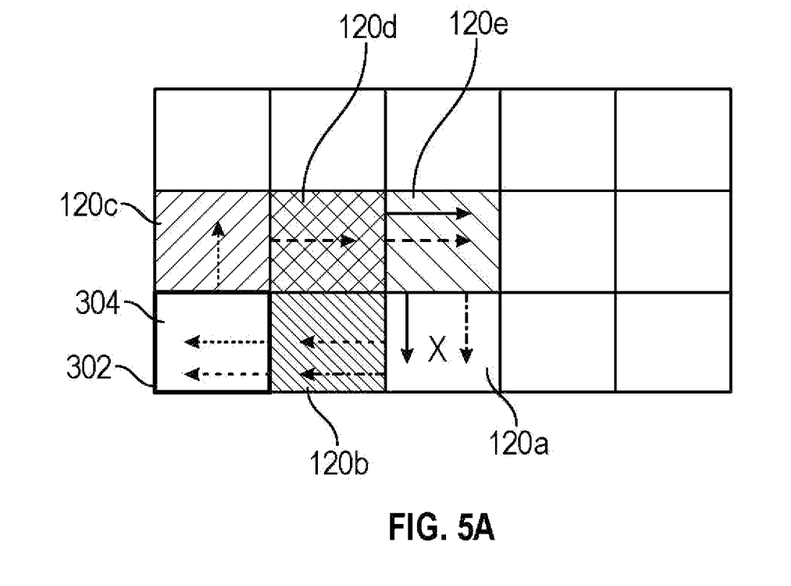
FIGS. 5A to 5C illustrate exemplary steps for moving standard containers using the modular conveyor system in accordance with the principles of the present disclosure.

For example, as shown in FIG. 5A, only elevator floor 304 does not have a standard container disposed thereon, and the determined pathway for standard container 102a to be moved to elevator floor 304 may be for standard container 102a to be moved to the left twice; however, standard container 102b is in the cell immediately to the left of standard container 102a. Accordingly, the determined moving pattern to clear the pathway for standard container 102a may be to move standard container 120b to the left, e.g., onto elevator floor 304, move standard container 102a to the left, e.g., where standard container 102b was initially, move standard container 102e down, e.g., where standard container 102a was initially, move standard container 120d to the right, e.g., where standard container 102e was initially, move standard container 102c to the right, e.g., where standard container 102d was initially, move standard container 102b up, e.g., wherein standard container 120c was initially, and then move standard container 120a to the left onto elevator floor 304. Thus, at step 408, the control module of vehicle 300 may cause the programmable moveable floors of the multi-floor cargo space, e.g., rollers and/or conveyor system 306 of each cell, to move to permit movement of the standard containers thereon in accordance with the determined moving pattern described above to move standard container 120a onto elevator floor 304.

Figure 5B:
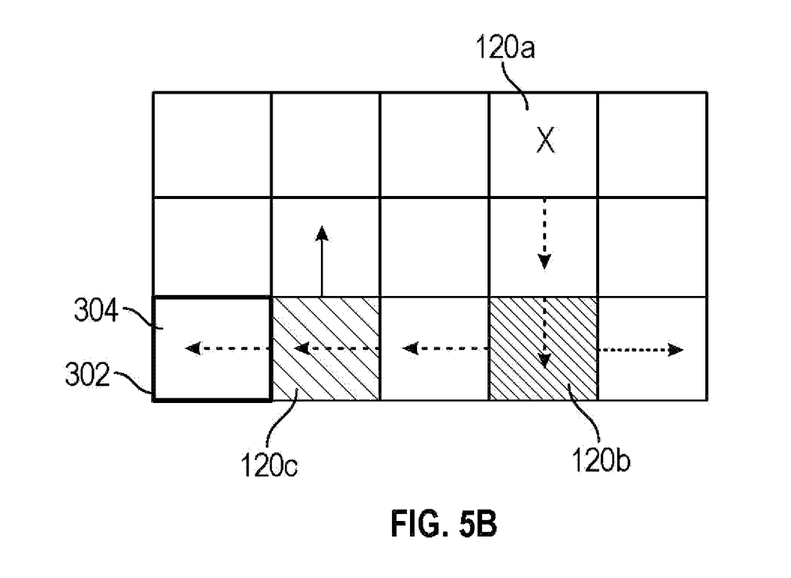

Illustratively, as shown in FIG. 5B, when multiple cells are empty, the determined pathway for standard container 102a to be moved to elevator floor 304 may be to move down twice, and to the left three times. Accordingly, the determined moving pattern to clear the pathway for standard container 102a may be to move standard container 120b to the right, move standard container 120c up, and then move standard container 102a down twice, and to the left three times onto elevator floor 304. Thus, at step 408, the control module of vehicle 300 may cause the programmable moveable floors of the multi-floor cargo space, e.g., rollers and/or conveyor system 306 of each cell, to move to permit movement of the standard containers thereon in accordance with the determined moving pattern described above to move standard container 120a onto elevator floor 304.

Figure 5C:
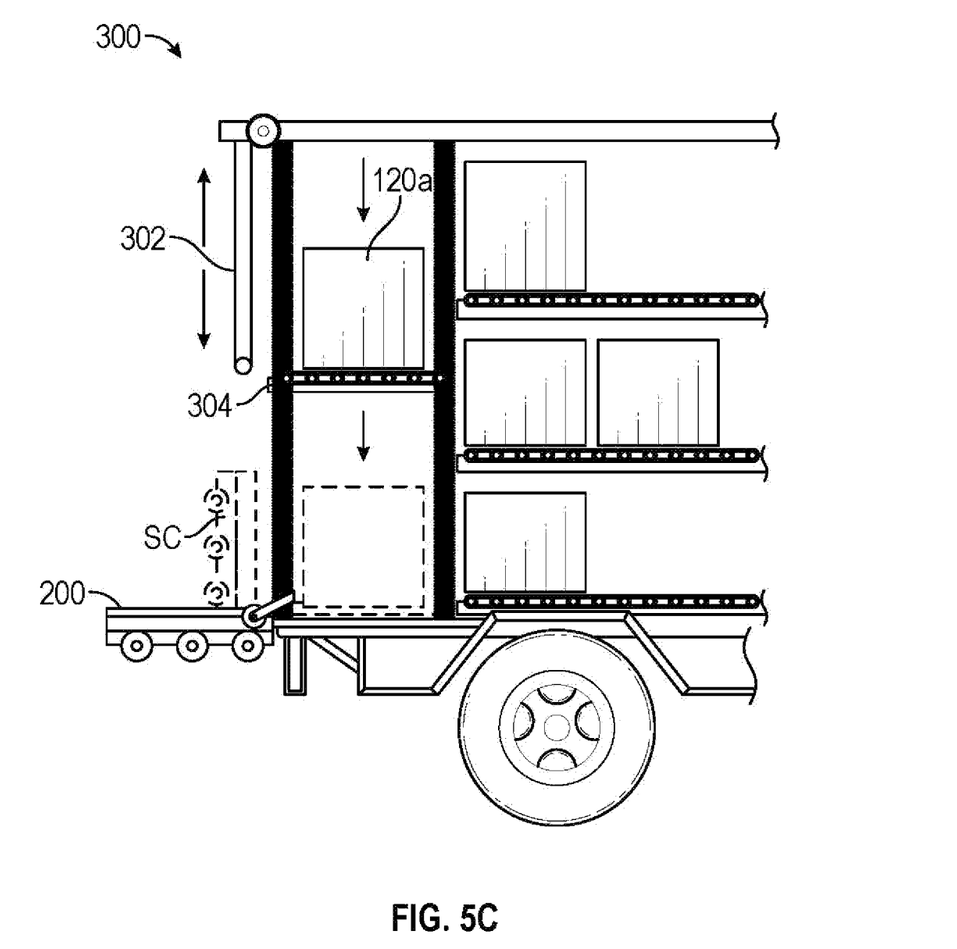

At step 410, elevator floor 304 may be lowered to the bottom floor, unless the floor of the multi-floor cargo space where the target standard container, e.g., standard container 120a, was located was already on the bottom floor. Standard container 120a may then be moved from elevator floor 304, and engage with modular robot 200, e.g., via container locking interface 208 and the platform locking interface of standard container 120a. As shown in FIG. 5C, modular robot 200 may be releasably coupled to vehicle 300 while vehicle 300 travels to the target delivery destination.

Accordingly, modular robot 200 may be coupled to vehicle 300 in a stowed configuration SC during travel of vehicle 300, and may transition to a deployed configuration as shown in FIG. 5C to receive standard container 120*a* from elevator floor 304. Modular robot 200 with standard container 120*a* disposed thereon may then be lowered to the ground floor, decoupled from vehicle 300, and self-drive to the target delivery destination.

Alternatively, modular robot 200 need not be coupled to vehicle 300 during travel of vehicle 300, but may already be at the target delivery destination. Thus, upon arrival of vehicle 300 and when standard container 120*a* is positioned on elevator floor 304, modular robot 200 may engage with vehicle 300 and elevator floor 304 to receive standard container 120*a* from elevator floor 304. Modular robot 200 with standard container 120*a* disposed thereon may then be lowered to the ground floor, decoupled from vehicle 300, and self-drive to the target delivery destination.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A modular conveyor system for delivering cargo, the system comprising:
a vehicle comprising:
a multi-floor cargo space, each floor of the multi-floor cargo space comprising a plurality of cells, each cell of the plurality of cells comprising a programmable moveable floor and configured to store a standard container;
an elevator extending across the multi-floor cargo space, the elevator comprising a programmable moveable elevator floor;
a modular robot including a modular platform configured to removeably engage with the programmable moveable elevator floor and to receive the target standard container, wherein the modular robot is releasably coupled to the vehicle in a stowed configuration during travel of the vehicle, wherein the modular robot is configured to transition from the stowed configuration to a deployed configuration in order to receive the target standard container from the programmable moveable elevator floor, and wherein, when the modular robot is in the deployed configuration, the modular platform is disposed parallel to the programmable moveable floor;
a memory that stores computer-executable instructions; and
a processor configured to access the memory and execute the computer-executable instructions to:
identify a target cell of the plurality of cells storing a target standard container within the multi-floor cargo space;
determine a pathway from the target cell to the programmable moveable elevator floor and a moving pattern configured to provide the pathway to the target standard container; and
cause the programmable moveable floors to move according to the moving pattern to move the target standard container to the programmable moveable elevator floor.

2. The system of claim 1, wherein the programmable moveable floors and the programmable moveable elevator floor each comprise a rotatable conveyor belt.

3. The system of claim 2, wherein the rotatable conveyor belt is configured to permit longitudinal movement in a first direction, and to rotate about a vertical axis to permit longitudinal movement in a second direction different from the first direction.

4. The system of claim 3, wherein the second direction is either 90 degrees, 180 degrees, or 270 degrees from the first direction.

5. The system of claim 1, wherein the elevator is positioned at a rear of the vehicle.

6. The system of claim 1, wherein the programmable moveable elevator floor is configured to move vertically between each floor of the multi-floor cargo space.

7. The system of claim 1, wherein each standard container comprises a unique identification code.

8. The system of claim 1, wherein each standard container comprises a moveable door and a lock configured to be actuated to lock and unlock the moveable door, and wherein the moveable door is configured to lock and be unlocked via actuation from the modular robot.

9. The system of claim 1, wherein each standard container is identical in size and shape.

10. The system of claim 1, wherein the modular platform comprises a first locking interface configured to releasably engage with a second locking interface of the target standard container.

11. The system of claim 1, wherein the modular platform comprises a retractable ramp configured to retract into an interior passage of the modular platform and be disposed substantial parallel to a floor of the modular platform, in a retracted position.

12. The system of claim 1, wherein the modular platform comprises a plurality of wheels configured to move the modular platform, and wherein, when the modular robot transitions from the stowed configuration to the deployed configuration, the modular platform rotates about an axis.

13. The system of claim 12, wherein the plurality of wheels are configured to readjust to angle the modular platform relative to a ground, and wherein, when the modular robot transitions from the stowed configuration to the deployed configuration, the modular platform rotates about 90 degrees about the axis.

14. A method comprising:
identifying a target cell of a plurality of cells of a multi-floor cargo space of a vehicle, each cell of the plurality of cells comprising a programmable moveable floor and configured to store a standard container, the target cell storing a target standard container within the multi-floor cargo space;
determining a pathway from the target cell to a programmable moveable elevator floor of an elevator extending across the multi-floor cargo space;
determining a moving pattern configured to provide the pathway to the target standard container;
moving the programmable moveable floors according to the moving pattern to move the target standard container to the programmable moveable elevator floor; and
receiving the target standard container from the programmable moveable elevator floor at a modular robot including a modular platform configured to removeably engage with the programmable moveable elevator floor, wherein the modular robot is releasably coupled to the vehicle in a stowed configuration during travel of the vehicle, and configured to transition from the stowed configuration to a deployed configuration in order to receive the target standard container, and wherein, when the modular robot is in the deployed configuration, the modular platform is disposed parallel to the programmable moveable floor.

15. The method of claim 14, wherein identifying the target cell comprises identifying the target standard container via an identification code unique to the target standard container.

16. The method of claim 15, wherein each of the programmable moveable floors comprises a rotatable conveyor belt, and wherein moving the programmable moveable floors comprises moving the rotatable conveyor belt to permit longitudinal movement in a first direction.

17. The method of claim 16, further comprising rotating the rotatable conveyor belt about a vertical axis to permit longitudinal movement in a second direction, the second direction being either 90 degrees, 180 degrees, or 270 degrees from the first direction.

18. The method of claim 15, further comprising moving the programmable moveable elevator floor vertically to a floor of the multi-floor cargo space comprising the target cell.

19. The method of claim 15, further comprising:
   engaging a modular platform with the programmable moveable elevator floor;
   moving the target standard container from the programmable moveable elevator floor to the modular platform; and
   coupling the target standard container to the modular platform.

20. The method of claim 14, further comprising the steps of:
   lowering the modular robot from the programmable moveable elevator floor to a ground;
   decoupling the modular robot from the vehicle; and
   self-driving the modular robot from the vehicle to a target delivery destination.

* * * * *